United States Patent [19]

Wheatley

[11] Patent Number: 4,512,884
[45] Date of Patent: Apr. 23, 1985

[54] FUEL TREATMENT DEVICE

[75] Inventor: William T. Wheatley, Walton-on-Thames, England

[73] Assignee: Lucas Industries, plc, Birmingham, England

[21] Appl. No.: 388,156

[22] Filed: Jun. 14, 1982

[30] Foreign Application Priority Data

May 25, 1982 [GB] United Kingdom ............... 8215237

[51] Int. Cl.$^3$ ............................................. B01D 35/02
[52] U.S. Cl. .............................. 210/136; 123/187.5 R; 210/238; 210/416.4; 210/438
[58] Field of Search .................. 210/416.4, 438, 232, 210/136, 234, 238, 305, 302, 306, 307; 123/187.5 R, 187.5 P

[56] References Cited

U.S. PATENT DOCUMENTS

| 1,652,731 | 12/1927 | Regan | 123/187.5 R |
|---|---|---|---|
| 2,092,685 | 9/1937 | Viel | 123/187.5 R |
| 2,516,787 | 7/1950 | Moody | 123/187.5 R |
| 3,294,240 | 12/1966 | Korte | 210/416.4 |
| 3,307,836 | 3/1967 | Arndt et al. | 123/187.5 R |
| 3,389,801 | 6/1968 | Sieger | 210/416.4 |
| 3,948,589 | 4/1976 | DuBois | 123/187.5 R |
| 4,324,660 | 4/1982 | Peyton | 210/DIG. 17 |
| 4,373,479 | 2/1983 | Billingsley | 123/187.5 R |

*Primary Examiner*—Barry S. Richman
*Assistant Examiner*—John Donofrio

[57] ABSTRACT

A fuel treatment device for use in fuel system of an internal combustion engine comprises a casing adapted to be secured, in use, to a mounting which defines a fuel inlet and an outlet. A fuel treatment element is located in the casing and a wall of the casing is displaceable by hand to achieve a pumping action.

11 Claims, 4 Drawing Figures

(FIG. 2) and separating the filter element from the mounting. A new element can then be inserted into position and held in place by the clips. When the element is detached from the mounting the valve 21 should close to prevent air flowing into the portion of the fuel system between the inlet 14 and the tank. Moreover, the valve 22 should prevent fuel spilling from the mounting. The new element will however be dry so that even if the engine can be started, it would very quickly run out of fuel. In this situation before attempting to start the engine, the plug 20 is removed and the lower portion of the casing is utilized as a bellows pump. As the base is moved upwardly air will tend to flow past the valve 23 through the vent and when the pressure on the casing is relaxed the resilience of the casing will cause the casing to assume its original position thereby drawing fuel into the filter element past the valve 21. This process is repeated until fuel starts to escape from the vent. The plug 20 is then replaced and the engine started. The amount of air remaining in the filter element will be very small and will probably be so small as not to interfere with the operation of the pump.

The valve 22 is not strictly necessary from the point of view of achieving a pumping action since the low pressure pump 10 is generally a constant displacement pump so that when it is not in operation, it closes off the outlet 20. The valve 22 however is useful to prevent fuel spilling when the element is removed.

In the arrangement shown in FIG. 3 parts which have the same function as the parts of FIG. 1 have the same reference numerals. It will be noted that only two recesses are provided in the housing and hence only two spigots are provided. Moreover, the position of the valve 22 is changed so that it is now disposed in the passage connecting the recess 18 with the outlet 12. Since the recess 19 has been dispensed with so also has the valve 23 and the vent plug 32 opens from the portion of the passage which lies between the valve 22 and the outlet 12. The operation of the filter is as described with reference to FIG. 1 but in this case when the plug 32 is removed the air is vented by way of the valve 22.

A facility is provided to enable water which may have accumulated in the bottom portion of the casing to be removed. This is achieved using a flexible drainage pipe 33 which is passed through the passage in the central spigot when the element is assembled to the mounting. The drainage pipe extends through the tubular member 28 so that its lower end lies adjacent the wall 26. The opposite or upper end of the pipe passes into a chamber 34 in the mounting and a disc valve 35 is provided to close the end of the pipe. Located in the chamber is a seating 36 which serves as an abutment for a spring which biases the valve member forming the disc valve. The seating defines a central aperture flow through which can be controlled by a manually operable valve member 37, the outer end portion of which is shaped to define a nipple. The valve member has a passage extending from the nipple to adjacent the seating.

In order to discharge water which may have accumulated in the bottom portion of the casing, a pipe is engaged about the nipple and the valve member 37 unscrewed from the seating. Operation of the lower portion of the casing as a bellows pump will cause water to be displaced up the pipe 33 past the valve 35 and through the passage in the valve member 37. When the bellows pump is relaxed fuel will be drawn into the inlet 14. During this process fuel may flow past the valve 22 but such flow should be small because the pump 10 will effectively close off the outlet 12. Once the water has been discharged the valve member is screwed down onto the seating.

The casing as shown in FIGS. 1 and 3 is preferably formed from plastics material. It may however be formed from metal although the production of the bellows section is less easy to achieve.

The lower section of the casing may as shown in FIG. 4 be shaped to provide a housing for a rolling diaphragm. As shown in FIG. 4 the lower portion of the casing 38 defines an inwardly extending step 39 against the inner surface of which is located an annular bead 40 formed at the edge of the skirt portion of a cup-shaped diaphragm member 41. This is formed from a flexible fuel and water proof material. The bead is held in place against the step 39 by a shaped annular retaining plate 42 which is engaged by projections on an extension of the tubular member 28. The retaining plate is provided with apertures to allow fuel and also water to flow into the diaphragm and the tubular member 28 is provided with apertures 28A beneath the member 29, the fuel flow to the outlet taking place through the apertures in preference to the flow of water from the bottom of the member 28. Within the diaphragm is a cup-shaped member 43 which locates one end of a spring 44 the other end of which engages the retaining plate.

An actuating member in the form of a flat plate 45 is engageable with the outer surface of the diaphragm and this is coupled by a stem extending with clearance through an aperture 48 in the base wall 47 of the casing, to an operating knob 46. As the knob 46 is moved towards the base wall against the action of the spring, the volume of the interior of the casing is reduced to obtain the pumping action.

The fuel treatment device may operate by sedimentation action only. In this case a separate filter element could be provided. The sedimentation action is assisted by the action of the truncated member 29 and water and large particles of dirt will tend to accumulate in the lower portion of the casing and/or the diaphragm. The tube 33 and associated vent can be provided in the treatment device incorporating the rolling diaphragm in its construction. In the case where the treatment is by sedimentation action only the mounting and the upper portion of the casing can be of the same design as for example shown in FIG. 3, it is likely however that a simpler and more robust form of construction would be employed in which the rim of the casing seals against an annular sealing ring located in the mounting. This is because is should not be necessary to charge or clean out the casing as regularly as in the case where a paper filter element is incorporated into the design.

I claim:

1. A fuel treatment device for use in a fuel system of an internal combustion engine, comprising:
   a casing means for containing a filter and for pumping fuel, said casing means comprising an outer wall means in direct contact with a fluid being filtered, said outer wall means including: a first section of generally cylindrical shape and having means thereon at one end thereof for attaching said casing means to a mounting, and a second pumping section means on another end of said first section for containing and pumping fluid, said second pumping section means closing said casing means and being collapsible to be moved axially of said casing means for reducing the volume within said casing

FUEL TREATMENT DEVICE

This invention relates to a fuel treatment device for use in a fuel system of an internal combustion engine.

A fuel system for an internal combustion engine comprises a high pressure pump which is actuated in timed relationship with an associated engine to deliver fuel under pressure to the combustion spaces of the engine. Fuel is supplied to the high pressure pump by a low pressure pump which is built into the same supporting body as the high pressure pump. A fuel treatment device is provided to clean the fuel which is drawn into the inlet of the low pressure pump. The treatment device may comprise a fuel filter or a sedimentation device. In the past it has been the practice to provide an additional pump generally of the diaphragm type which is operated by the engine and which draws fuel from the fuel tank and forces the fuel through the treatment device to the inlet of the low pressure pump. The additional pump has a high displacement rate with the result that when air is allowed to enter the system, fuel is supplied quickly to the low pressure pump without the need for excessive cranking of the engine.

With the increased application of compression ignition engines to small passenger vehicles and the desire to reduce cost, the additional pump has been omitted from the system. Once the system is primed with fuel the low pressure pump is able to guarantee the supply of fuel to the high pressure pump but when the system has to be primed considerable cranking of the engine must take place before an adequate quantity of fuel is available to start the engine. This places a heavy load on the starting motor of the engine and also the storage accumulator. It is inconvenient to increase the size of the low pressure pump since this inevitably requires the supporting body to be enlarged thereby requiring more space on the engine.

The object of the invention is to provide a fuel treatment device in a form in which it can be used to assist the priming of the fuel system.

According to the invention a fuel treatment device for use in a fuel system of an internal combustion engine comprises a casing of generally cylindrical form, one end of said casing being closed and the other end of the casing being adapted so that in use it can be secured to a mounting, a fuel treatment element located in said casing, and means defining a displaceable wall at said one end of the casing, said wall when deflected reducing the volume of the casing in a manner of a pump.

Examples of fuel treatment devices in accordance with the invention will no be described with reference to the accompanying drawings in which.

Figures 1, 2:
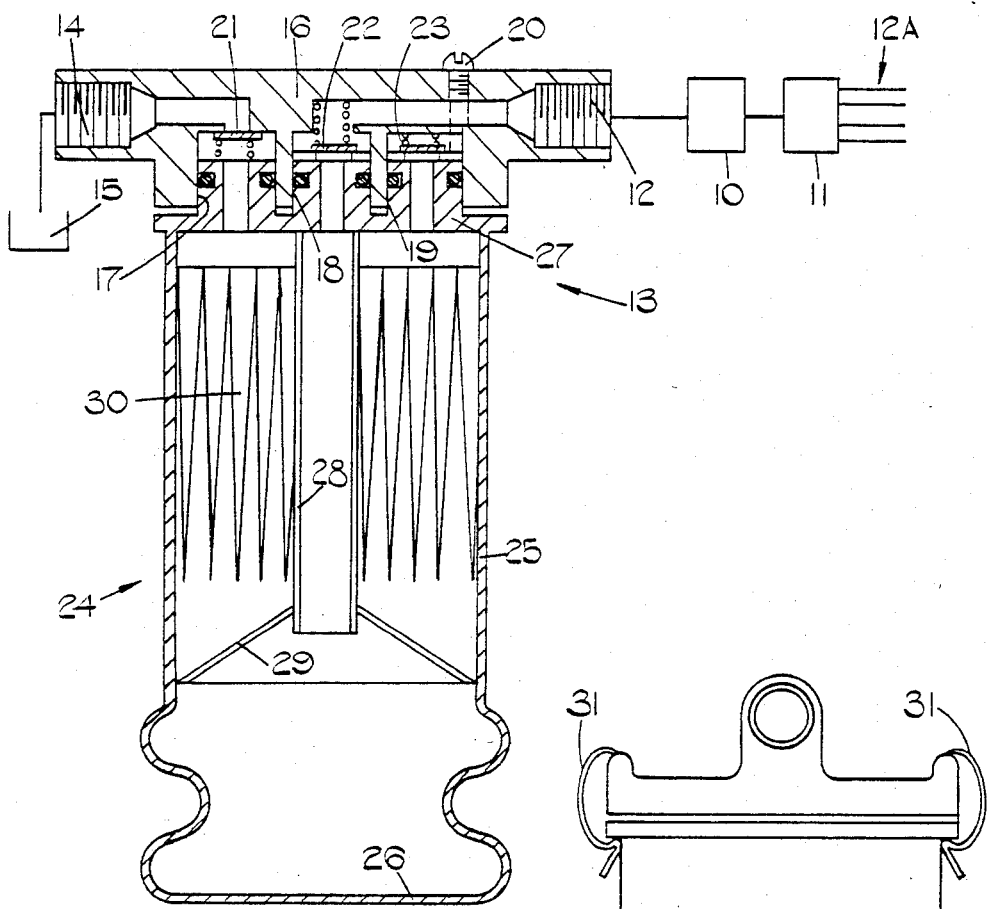
FIG. 1 is a sectional side elevation of a fuel treatment device in the form of a filter element shown mounted on a mounting, with the remaining portions of the fuel system.
FIG. 2 is an exterior view of the filter element and its mounting taken generally at right angles to FIG. 1.
Figure 3:
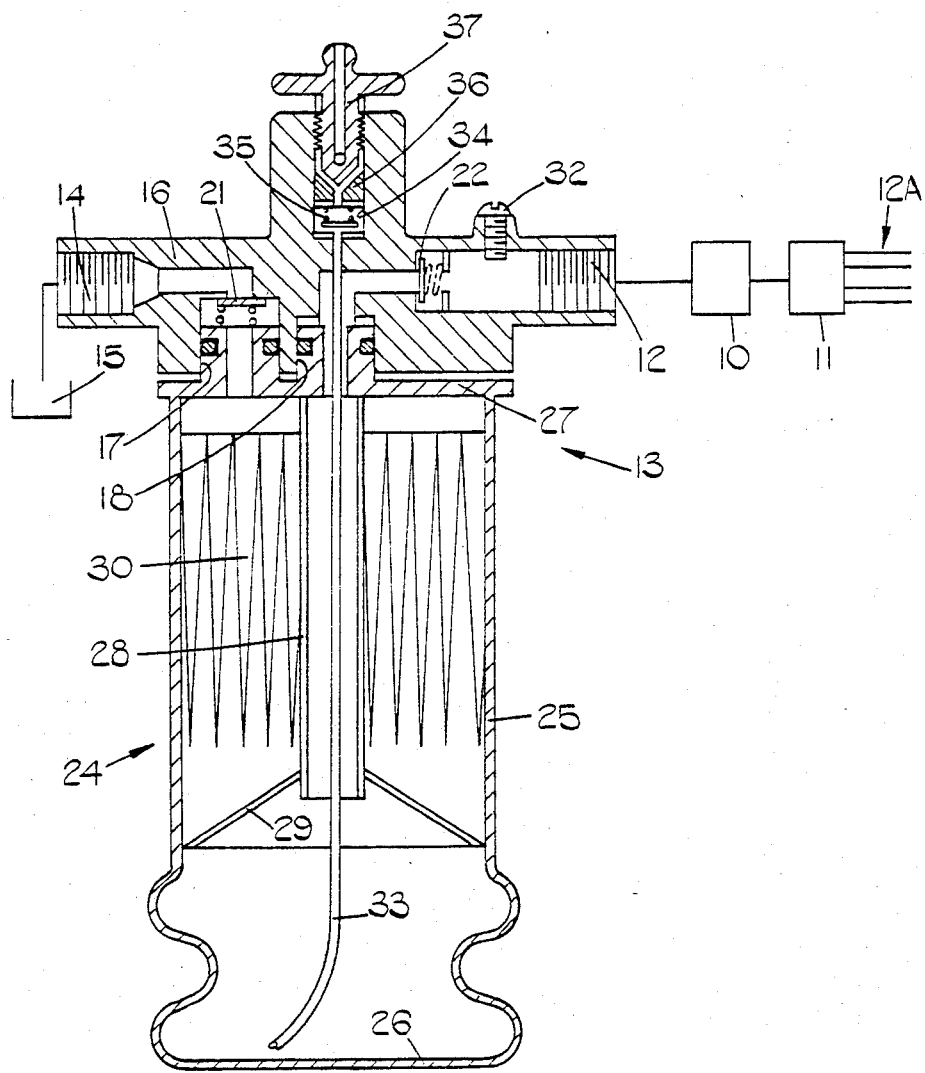
FIG. 3 is a view similar to FIG. 1 showing a modified form of device and mounting.
Figure 4:
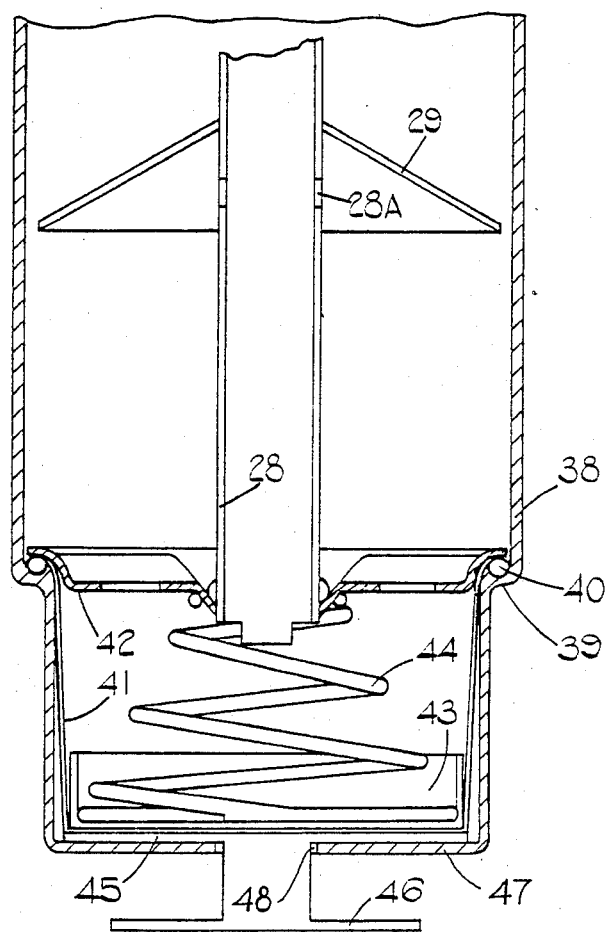
FIG. 4 shows a modification which may be effected to the devices of FIGS. 1 and 3.

Referring to FIGS. 1 and 2 of the drawings the fuel system comprises a low pressure fuel pump indicated at 10 which supplies fuel under pressure to a high pressure pump 11 which has a plurality of outlets 12A connected in use to the fuel injection nozzles of the associated engine. The pumps 10 and 11 are housed within a common body from which extends a drive shaft adapted to be driven by a rotary part of the engine so that fuel is supplied to the injection nozzles in time relationship with the engine.

The inlet of the pump 10 is connected to the outlet 12 of a filter which is generally shown at 13 and which includes an inlet 14 connected in use to a fuel tank 15. The inlet 14 and the outlet 12 are formed in a mounting 16 which is adpated to be secured to a supporting body. The mounting defines three cylindrical recesses 17, 18, and 19 in one face thereof. The recess 17 is connected to the inlet 14, the recess 18 to the outlet 12 and the recess 19 can be opened to the atmosphere through a vent upon removal of a screwed plug 20.

Located in the recesses are non-return valves 21, 22 and 23. The valves are of the plate variety and are spring loaded to the closed position this being the position of each valve seen in FIG. 1. It will be observed that valve 21 closes the inlet 14 to the recess 17, the valve 22 closes the outlet 12 from the recess 18 and the valve 23 closes the recess 19 from the atmosphere when the plug 20 is removed.

Also forming part of the filter is an element generally indicated at 24. The element comprises a casing 25 which conveniently is formed from plastics material, the casing being of cylindrical form having an integral end wall 26. The side wall of the casing adjacent the end wall is sinuous in section and the material forming the casing is resilient so that this end portion of the casing forms the equivalent of a bellows. The remaining portion of the casing is of right cylindrical form and it has an end closure 27 which is provided with spigots for engagement within the aforesaid recesses respectively. The spigots define circumferential grooves in which are located sealing members to establish fuel tight seals with the side walls of the recesses. Each spigot is provided with a passage extending therethrough.

The passage in the central spigot communicates with a tubular member 28 which extends towards the end wall 26 and which adjacent its lower end carries a truncated member 29 which has a clearance with the outer wall of the casing. The annular space between the external surface of the member 28 and the internal surface of the casing is occupied by a filter medium 30 which conveniently is of the paper type. The medium is sealed to the aforesaid surfaces of the member and the casing. The passages in the outer spigots lead directly to the portion of the annular space defined between the filter medium and the closure 27.

In operation, and considering firstly that the system is completely filled with fuel, fuel will be drawn from the outlet 12 by means of the pump 10 and in so doing the valve 22 will be lifted from its seating so as to permit the fuel to be drawn through the tubular member 28 from beneath the truncated member 29. The fuel flowing to the tubular member is drawn through the filter medium and this fuel is drawn from the tank 15 through the inlet 14 past the valve 21. Any water which is contained within the fuel will tend to coalesce within the filter medium and the droplets of water will pass through the filter medium and will drop onto the member 29 and will accumulate in the bottom of the casing so that substantially water free fuel will be supplied to the pump 10. Any particles of foreign matter contained within the fuel will be retained by the filter medium. After a period of use it is necessary to change the element and this is achieved by detaching retaining clips 31 means; a delivery tube attached to the mounting means to be located axially of said casing; a filter member located within said casing means first section and extending axially of said first section, and a dividing member attached to said delivery tube and spaced from said casing means first section to define a gap means for passing fluid from said filter member into said casing means second section, said delivery tube opening into said casing means second section for receiving fluid moved out of said second section when said second section is collapsed whereby fluid can be pumped by and from said casing means.

2. A device according to claim 1 in which said casing means is formed from resilient material whereby the casing can resume its original form after manual deflection.

3. A device according to claim 2, in which the casing is formed from plastics.

4. A device according to claim 1 in which said second section is defined by a diaphragm the outer peripheral surface of which is held in sealing engagement with the casing means, a manually operable means for displacing the diaphragm in a direction to reduce the volume of the casing means and resilient means acting on the diaphragm in the direction to move the diaphragm in the direction to increase the volume of the casing means.

5. A device according to claim 4, including a step defined in the casing means, said diaphragm being of cup-shaped form and having a bead at its edge, said bead being located against said step, and a retaining member acting to retain said bead against said step.

6. A device according to claim 5 wherein said retaining member is in the form of an annular plate the outer peripheral surface of which is shaped to press said bead against the step and the inner peripheral surface being held by projections on said tube, and apertures in said retaining member.

7. A device according to claim 6, including a cup-shaped member located against the inner surface of the base wall of the diaphragm and a coiled spring forming said resilient means located between said cup-shaped member and said retaining member.

8. A device according to claim 7 including actuating means to effect movement of the diaphragm and cup-shaped member against the action of the spring.

9. A fuel system according to claim 8 including a valve means in said fuel outlet and an air vent communicating with the casing first section, said air vent being controlled by the valve means of said outlet or by an additional valve means.

10. A fuel system according to claim 8, including a tube carried by said mounting and a further valve means for controlling the flow of liquid through said delivery tube to the exterior of said casing.

11. A fuel system according to claim 10 in which said further valve means comprises a flap valve and a manually operable valve operable from the exterior of the mounting.

* * * * *